Aug. 28, 1951     L. H. BEST     2,565,645
BEARING FOR DISPLAY RACKS
Original Filed Jan. 31, 1946     6 Sheets—Sheet 1

INVENTOR.
Leon H. Best
BY Wallace and Cannon
Attorneys

Aug. 28, 1951 — L. H. BEST — 2,565,645
BEARING FOR DISPLAY RACKS
Original Filed Jan. 31, 1946 — 6 Sheets-Sheet 2

INVENTOR.
Leon H. Best
BY Wallace and Cannon
Attorneys

Aug. 28, 1951 L. H. BEST 2,565,645
BEARING FOR DISPLAY RACKS
Original Filed Jan. 31, 1946 6 Sheets-Sheet 3
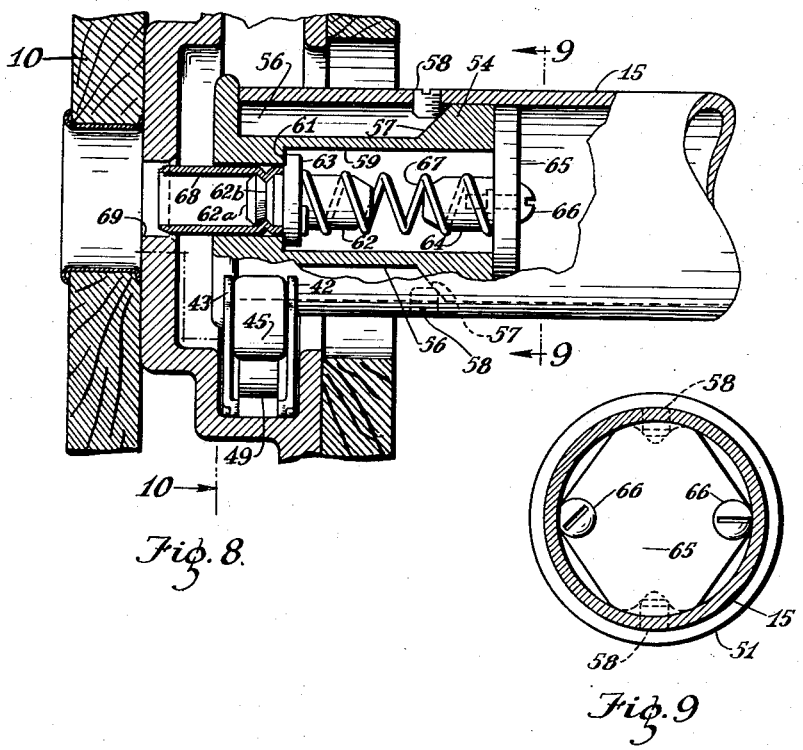
Fig. 8.
Fig. 9.
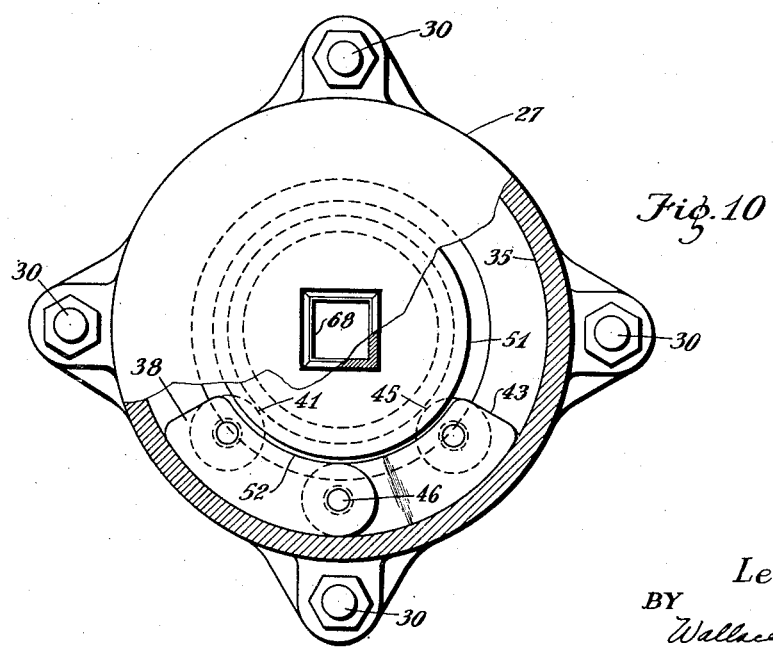
Fig. 10
INVENTOR.
Leon H. Best
BY Wallace and Cannon
Attorneys

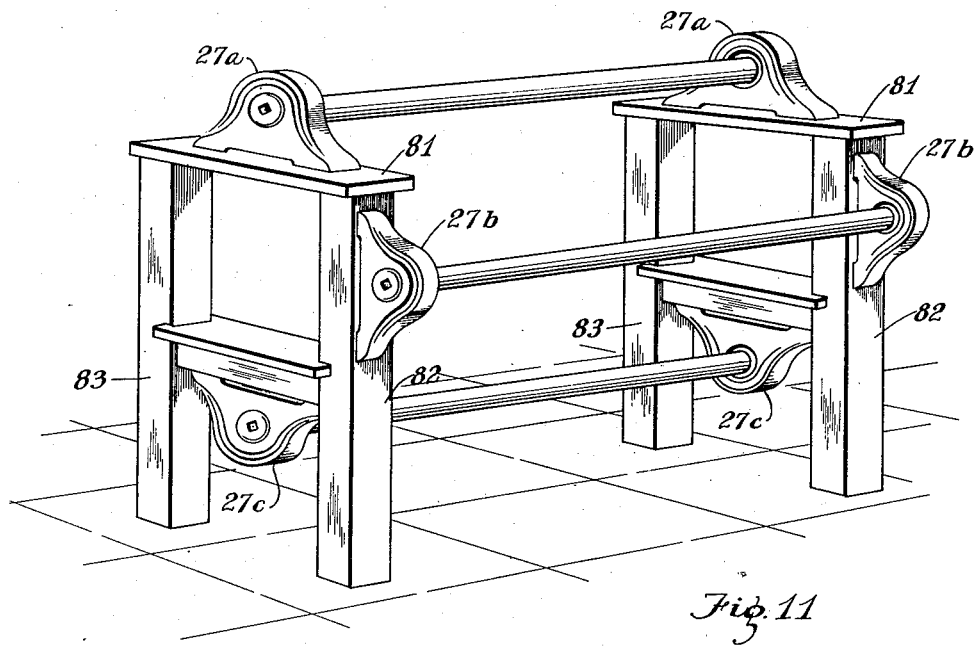
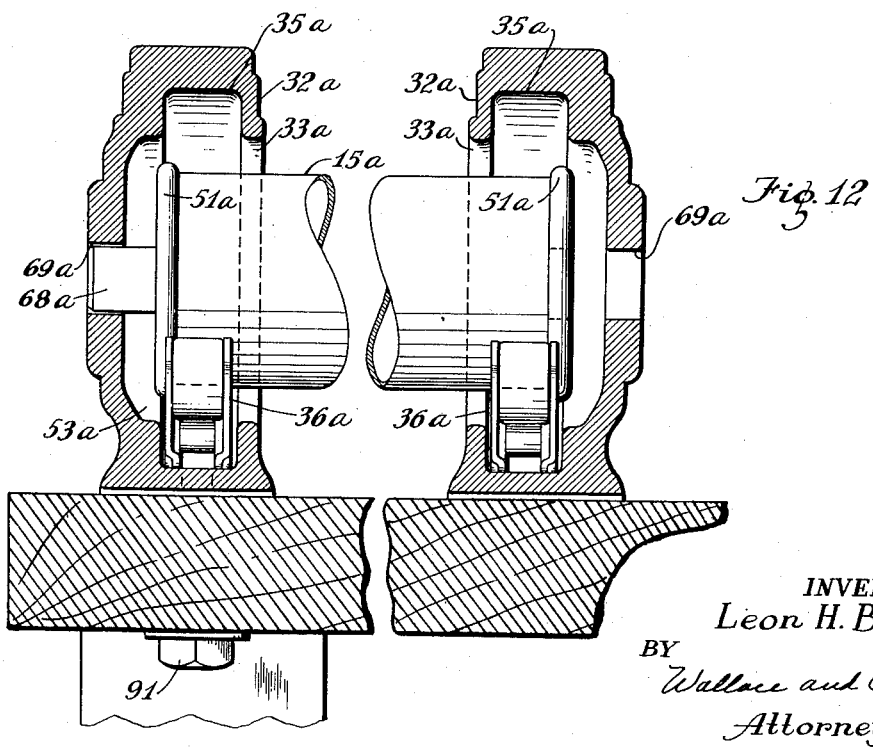

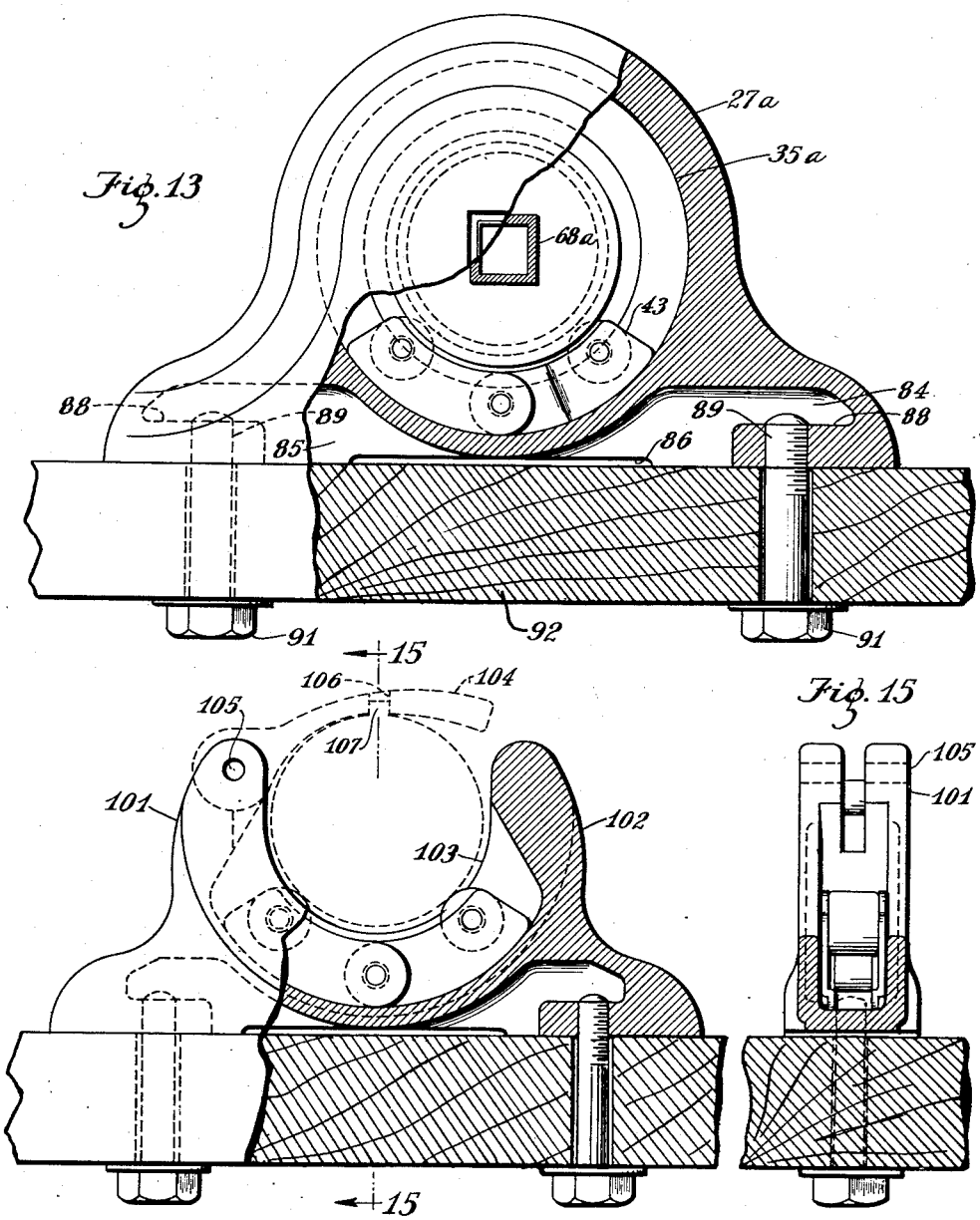

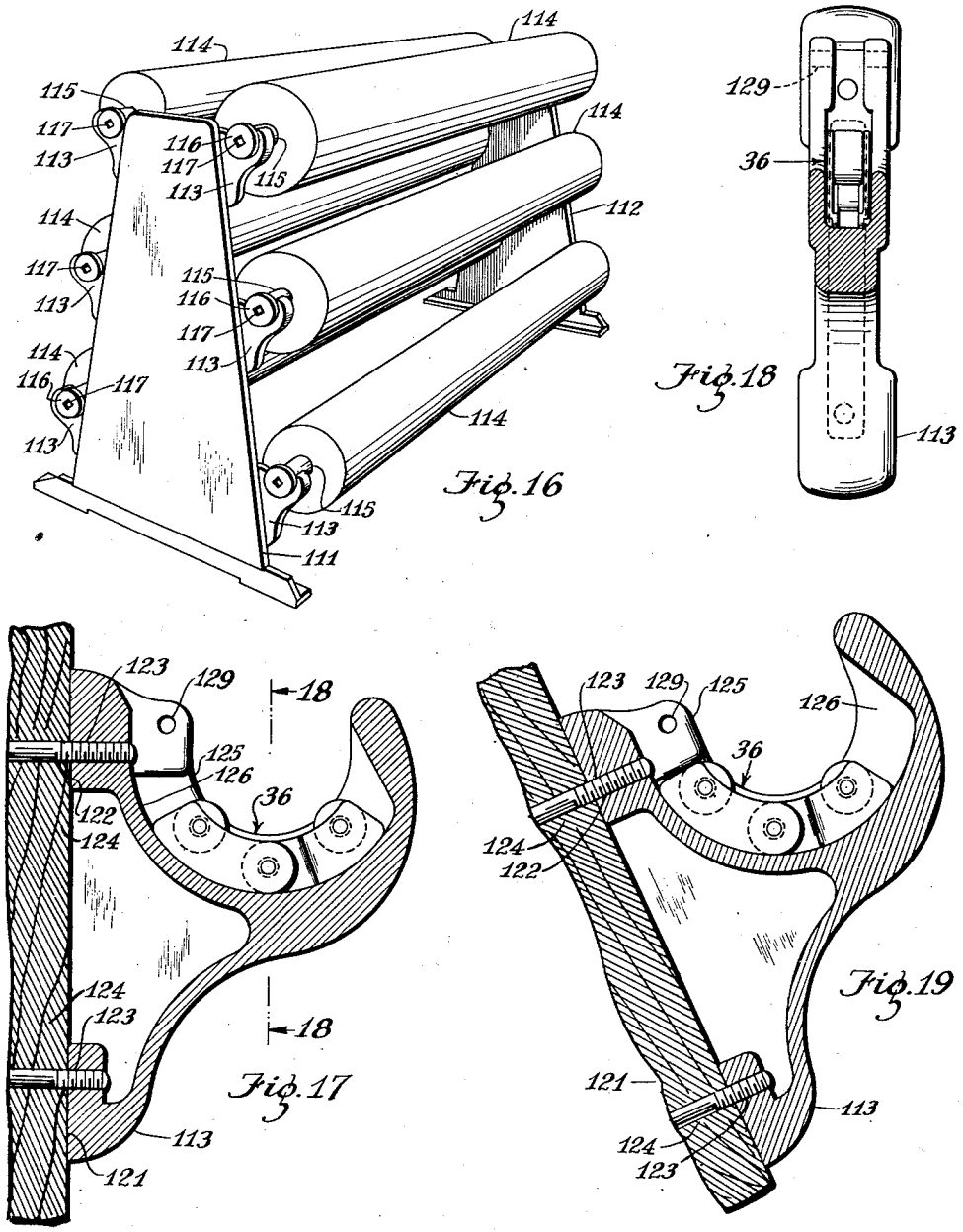

Patented Aug. 28, 1951

2,565,645

UNITED STATES PATENT OFFICE 2,565,645

BEARING FOR DISPLAY RACKS

Leon H. Best, Galva, Ill., assignor to John H. Best & Sons, Inc., Galva, Ill., a corporation of Illinois Original application January 31, 1946, Serial No. 644,571. Divided and this application December 15, 1950, Serial No. 200,905

4 Claims. (Cl. 308—202)

This application is a division of my co-pending application, Serial No. 644,571, filed January 31, 1946.

This invention relates to an improved bearing for display racks and the like, that are used for displaying and handling heavy rolls of sheet material such as broadloom carpet, linoleum, canvas, and the like.

In displaying material of the type mentioned, it is necessary to provide strong, rigid supports which permit convenient rolling and unrolling. In display racks of the type for which my invention is particularly adapted, large bearing units capable of receiving a shaft which may be two inches or larger in diameter carrying loads of several hundred pounds are required. Such bearing units must be relatively inexpensive and yet must give excellent performance at low speeds under heavy loads. Also to meet the varying conditions in design of display equipment, bearing support units must be constructed so that they may be mounted in many positions. For the better types of display equipment, a bearing unit is needed which can be substantially hidden from view.

It is an object of my invention to provide simple effective bearing supporting elements which may be mounted in various positions depending upon the type of display devices with which they are to be used. It is a further object to provide simple efficient bearing elements which may be installed in bearing supports for easy maintenance and replacement.

Further objects of my invention are to provide efficient, inconspicuous bearing means which may be mounted so as not to detract from the appearance of the display equipment and yet be readily accessible and convenient for use.

Additional objects of my invention are to provide collapsible bearing elements which may be readily inserted or removed from the bearing supporting means and which will remain in place against accidental or unintentional displacement without any fastening or securing being required.

Other and further objects of the present invention will be apparent from the following description and claims and are illustrated in the accompanying drawings which, by way of illustration, show preferred embodiments of the invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

Fig. 8 is a fragmentary detail view similar to the left-hand part of Fig. 4 showing additional construction details of a locking mechanism;

Fig. 9 is a vertical section on line 9—9, Fig. 8, showing details of construction of certain elements of the locking means;

Fig. 10 is a fragmentary sectional view on line 10—10, Fig. 8, showing certain details of the bearing and locking means;

Fig. 11 is a perspective view of another type of display rack incorporating a modified form of my invention;

Fig. 12 is an enlarged sectional view showing in detail one of the brackets illustrated in Fig. 11;

Fig. 13 is an end elevation of the bearing unit shown in Fig. 12, certain parts being broken away and shown in section to illustrate details of construction;

Fig. 14 is a view generally similar to Fig. 13 showing a modified form of bearing supporting means;

Fig. 15 is a sectional view taken on the line 15—15 of Fig. 14;

Fig. 16 is a perspective view of still another form of display rack incorporating another modified form of my invention;

Fig. 17 is a detail sectional view of one of the bearing units shown in Fig. 16;

Fig. 18 is a sectional view taken on the line 18—18, Fig. 17; and

Fig. 19 is a view similar to Fig. 17 showing the bearing unit tilted at an angle to illustrate how it may be mounted in various positions.

Figure 1:
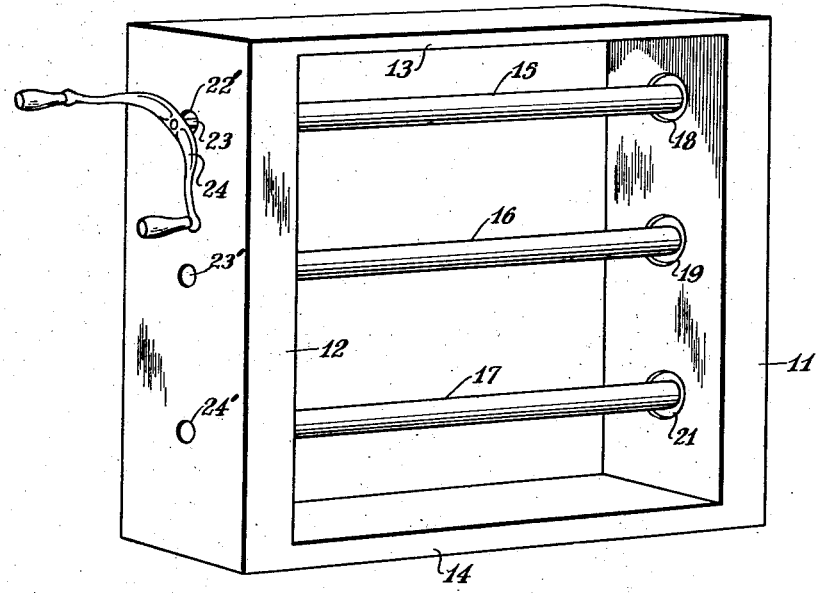
Fig. 1 is a perspective view of a display rack of a type in which the bearing means of my invention may be used.

Taken generally, the drawings show a bearing support member or housing which is adapted to be mounted in various ways on various types of supports and to receive in appropriate bearing position a roller bearing assembly which serves to reduce friction under heavy loads and yet which is simple in operation and assembly. Thus, in Fig. 1, a display rack is shown which may comprise a frame with end members 11, 12, a top member 13 and a bottom member 14. The rolls of sheet material, broadloom rugs or linoleum, for example, may be mounted upon hollow supporting shafts shown at 15, 16, and 17. These shafts which are commonly lengths of ordinary pipe or similar material are adapted to have their ends mounted in bearing members to support them and to permit free and relatively frictionless rotation in rolling or unrolling operations.

Figure 2:
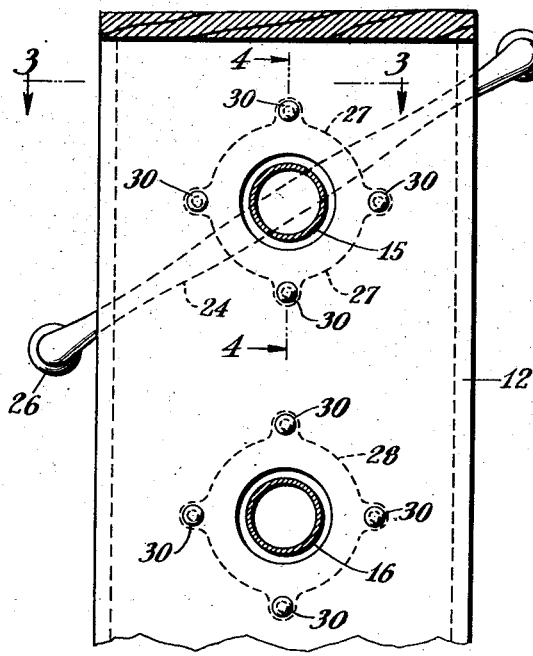
Fig. 2 is a detail view on a larger scale of certain elements shown in Fig. 1, some parts being in section and parts being broken away to show certain details of my improved bearing means.
Figure 3:
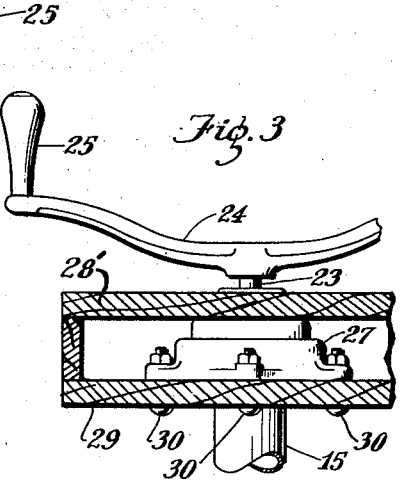
Fig. 3 is a detail sectional view taken on line 3—3, Fig. 2.

The end frame member 11 is provided with openings 18, 19 and 21 and the other end frame member 12 is provided with openings 22', 23', and 24'. The inner portions of these openings are large enough to receive the ends of the tubular supporting shafts 15, 16 and 17. The outer portions of the openings are smaller so as to conceal the bearing assemblies and yet afford access to rotating and locking means by the insertion of the shank 23 of a crank member 24. As shown in Figs. 2 and 3, the crank member 24 may be provided with two handles 25, 26.

Referring now to Fig. 2, bearing brackets or mounting means 27, 28 which are identical are mounted in the end members 11 and 12. As shown in Fig. 3, the end members 11 and 12 may comprise two spaced walls 28' and 29 to which bearing brackets 27 may be fastened, for example, to the inner wall 29 by means of bolts 30.

Figure 4:
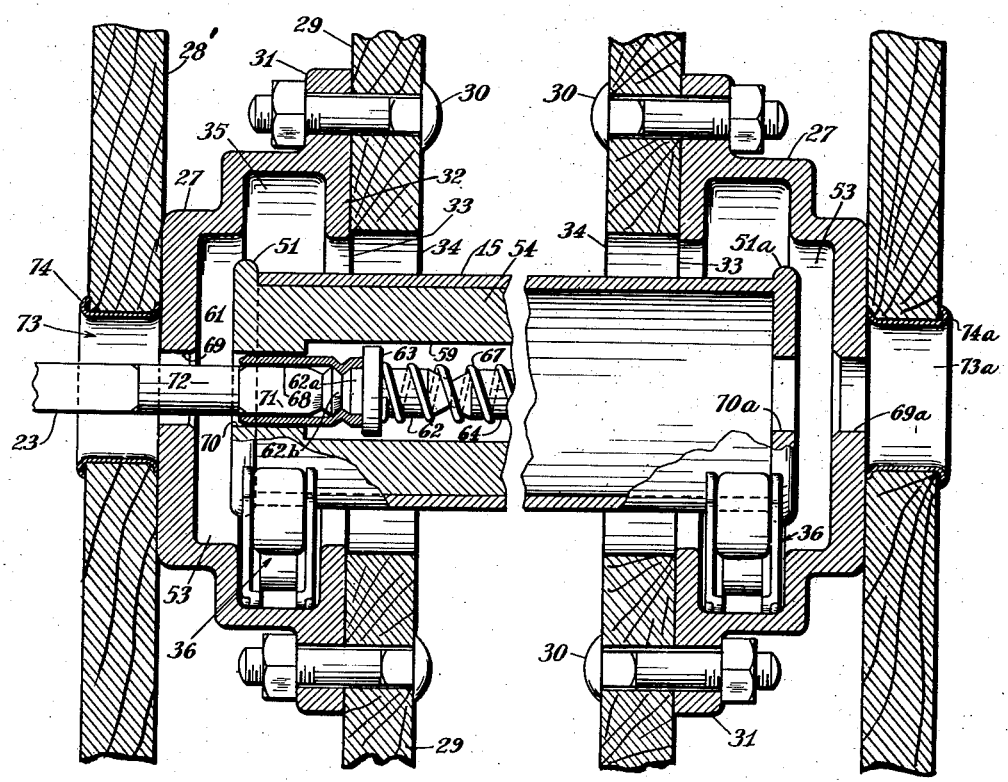
Fig. 4 is a detail sectional view on a still larger scale showing certain details of construction of my bearing means and taken along the line 4—4, Fig. 2.

Fig. 4 shows an enlarged section of a complete shaft assembly including the two end bearing assemblies and locking means. As illustrated in this figure, the bearing housing or bracket 27 is a hollow hub-like structure which may be of cast iron provided with lugs 31 through which the bolts 30 are passed to secure the housing to the frame. The inner wall 32 of the housing 27 is provided with a large opening 33, a similar opening 34 being provided in the wall member 29 to receive the end of a supporting tube or shaft 15. Outwardly of the wall 32, the circumferential wall of the housing is expanded to form an annular recess 35 which is adapted to receive a roller bearing assembly 36.

Figure 5:
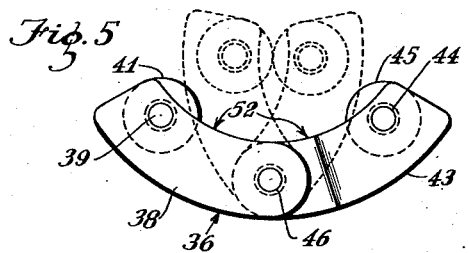
Fig. 5 is a detail elevation of my improved bearing element, per se.
Figure 6:
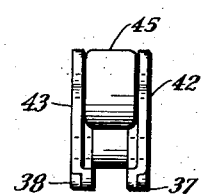
Fig. 6 is an end view of the bearing element shown in Fig. 8.
Figure 7:
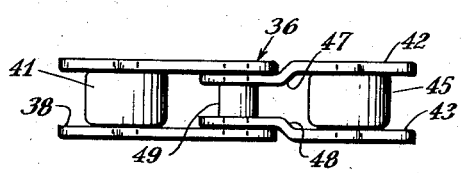
Fig. 7 is a plan view of the same bearing element.

The roller bearing assembly 36, as shown in detail in Figs. 5, 6 and 7, comprises a pair of arcuate side plates 37 and 38 which are connected together near one end of each by means of a pin 39 which mounts a bearing roller 41. Another pair of arcuate plates 42 and 43, generally similar to the plates 37 and 38, are connected together in a similar fashion by means of a pin 44 mounting a bearing roller 45. At their other ends plates 37, 38, and plates 42, 43 are hinged together as shown in Fig. 5 by means of a pin 46. The ends of plates 42 and 43 are offset inwardly to fit between the ends of plates 37 and 38. A spacing sleeve 49 is mounted on the hinge pin 46 between the offset ends 47 and 48 to keep the plates 42 and 43 properly spaced and in contact with the outer plates 37 and 38.

The annular recess 35 in the bearing bracket 37 is of the proper width and depth to receive the hinged bearing assembly 36 and to permit the anti-friction rollers 41 and 45 to project above surrounding surfaces so as to support the ends of the tubular shaft 15. In the expanded position shown in full lines in Fig. 5, the bearing assembly is to long to be inserted in the annular recess provided in the bracket or housing 27. The hinge construction permits folding the two sections to the dotted line position shown in Fig. 5 to a permit ready insertion into bearing position. After the bearing is inserted, the ends are returned to full line position where they are ready to support the shaft 15 with its load.

The construction described permits ready insertion and removal of the bearing assembly and at the same time prevents accidental displacement of the bearings from their proper positions upon insertion or removal of the supporting shaft 15.

The bearing housings and the roller bearing assemblies just described are identical in construction for both ends of the tubular shaft. Outwardly of the annular recess 35 the bearing housings 27 are provided with a recess 53 which is generally of cylindrical form to afford limited axial movement of the shaft 15 to facilitate its insertion or removal. As shown in Fig. 4, both ends of the tubular shaft are provided with flanges 51 and 51a to prevent undesired longitudinal displacement out of the bearing position.

One end of the hollow supporting shaft 15 is provided with an inserted member which, in addition to the projecting flange 51 mentioned above, includes a housing 54, integral with the flange part, containing certain automatic locking mechanism now to be described. The housing 54 is of hollow cylindrical form having two longitudinal grooves 56 in its outer surface which extend inwardly from the flanges 51 for a distance. The grooves 56 terminate in sloping surfaces 57 against which set screws 58 in the tubular shaft may set to lock the tube to the housing.

Through the greater part of its length, the housing 54 is provided with a cylindrical recess 59 terminating in an end wall 61. A sliding plunger 62 is provided with an annular flange 63 which is adapted to limit axial movement of the plunger by abutment against the end wall 61. A stud 64 is fixed to a cap member 65 which is secured by screws 66 to the housing assembly, as shown in Fig. 9. A compressed spring 67 surrounds the fixed stud 64 and a similar part on the plunger 62 to urge the sliding member outwardly or to the left, as shown in Figs. 4 and 8. Movement to the left is, of course, limited by contact between the annular flange 63 and the wall 61.

To the left of the flange 63, as shown in Figs. 4 and 8, the sliding plunger 62 carries a projecting stud 62a which is provided with an annular groove 62b. A sleeve 68 is secured to the stud 62a by indenting portions thereof into the annular grooves 62b. The sleeve 68 is of hollow square cross section. When it is projected outwardly or to the left, Fig. 8, the sleeve 68 engages a square hole 69 provided in the outer wall of the housing 27. This engagement locks the sleeve, the housing 54 and the tubular shaft 15 against rotation. Since the sleeve 68 has an inner cross section which is square, it receives the square shank portion 71 of the crank stud 23 mentioned above. Hence, when the crank 24 is forced inwardly against the tension of the spring 67 the square sleeve 68 is removed from locking engagement with the hole 69 in the housing 27.

Hence, the supporting shaft 15 carrying the roll of material may be rotated by turning the crank 24 to wind or unwind as desired. Release of the crank 24 permits the spring 67 to lock the shaft against rotation by projecting the sleeve 68 into opening 69. The stud 23 of the crank member 24 has a cylindrical surface 72 machined thereon so as to permit free rotation within the square hole 69 when the crank is fully inserted against the force of the spring 67. To withdraw the crank 24 it must be turned until the flat surfaces on the square portion thereof are substantially in alignment with the sides of the square hole 69. This operation obviously places the sleeve 68 in substantial alignment with the same hole so that locking takes place immediately upon withdrawal of the crank.

Fig. 8 shows the parts in locking position, the inner portion of the opening 69 and the outer end of the tubular sleeve 68 being beveled slightly to facilitate the locking operation. In the position shown in Fig. 4, the locking means obviously are inoperative.

Openings 73 are provided in the outer frame members of the display device to provide access of the crank stud to the locking means just described. An ornamental ferrule 74 may be provided to guard the end member 11 against marring by repeated insertions of the crank. The right-hand members 12 of the frame are also provided with similar openings 69a, 70a, and 73a and with a ferrule 74a corresponding to the elements in the left-hand member. The roll can be turned by a crank inserted at either end provided the locking means is rendered inoperative.

Figs. 11 to 13 show a different type of display rack with a modified bearing and locking assembly. Internally the housing of each of the bearing assemblies is of the same structure as that described above. The brackets or housings 27a, 27b and 27c, Fig. 11, are all of identical construction. Each comprises a housing member having a large opening 33a in its inner wall 32a, an annular recess 35a which is adapted to receive a bearing assembly 36a, and a smaller cylindrical recess 53a outwardly of the annular recess to receive the end flanges 51a of a tubular supporting shaft, such as 15a. As in the case of the housing 27, the outer wall is provided with a square opening 69a adapted to receive a locking sleeve 68a, the parts being generally identical with the elements described above.

Each of the housings 27a, 27b, and 27c is provided with a flat base which is adapted to rest firmly on, against or under supporting members such as the horizontal beam 81, the vertical frame member 82, or the horizontal support member 83. As best shown in Fig. 13, the base may be cut away at 84, 85 and 86. Web portions 87 and 88 are provided to present smooth and firm supporting surfaces. Threaded openings 89 are provided in said web portions to receive bolts 91 which secure the housing to a suitable support 81, 82, or 83, Fig. 11, or 92, Fig. 13.

The recess 35a, Fig. 13, like the recess 35, previously described, is completely annular so that a continuous seat is provided for the hinged roller bearing assembly 36 or 36a no matter in what position the bracket is mounted. Whether the supporting surface is horizontal, vertical, or on the bottom side of a supporting frame member, the bearing assembly may be inserted at the bottom of the recess 35a so as to properly support the shaft 15 or 15a. The same locking means may be used as described above in connection with Figs. 1 to 10.

Figs. 14 and 15 show a modified form of bearing and locking assembly which does not incorporate automatic locking means. As shown, the bearing bracket or housing is semi-circular in shape and open at the top. The base is similar to the base of the housing shown in Fig. 13 for mounting upon a suitable support. An annular channel 103 is provided to receive a bearing assembly 36 identical with the assembly described above. This channel terminates near the upper ends 101, 102 of the semi-circular housing or bracket. The channel is of such length, however, that the bearing may be mounted in various angular positions and still permit the roller bearings to be properly positioned under the supporting shaft 15.

A conventional locking latch 104, Fig. 14, is pivoted to one side of the housing, as shown at 105. This latch includes a slot 106 which may be dropped over the end of a pin 107 which extends through the tubular shaft 15 and projects therefrom a suitable distance.

Fig. 16 shows another modified form of my invention wherein bearing units of the general type shown in Fig. 14 are adapted for mounting on vertical or approximately vertical supporting members. As shown in Fig. 16, a display device may comprise end wall members 111 and 112 to which a member of open type bearing support members 113 are secured. Rolls 114 of linoleum, broadloom carpet, or other heavy sheet material, are supported on shafts 115 which may be identical with or similar to the shafts 15 previously described. The supporting shafts 115 are preferably provided with flanges 116 to guard against unintentional axial displacement. The end members of the supporting shafts 115 are preferably provided with square recesses 117 to facilitate rotation with a crank or other suitable instrument, not shown.

As shown in Figs. 17 and 18, each of the bearing support members 113 comprises supporting elements provided with smooth vertical surfaces 121 and 122 adapted for fitting firmly against a vertical frame member, or the like. Threaded openings 123 are provided in the supporting elements to receive bolts 124 which secure the bearing units to the frame of the display rack. The brackets 113 are of the open type having a semi-circular opening 125 provided with a recess 126 adapted to receive a hinged bearing assembly 36 identical with that described above. A latching means similar to that shown in dotted lines in Fig. 14, of conventional construction, may be attached by a suitable pin inserted through the opening 129 in the bracket member.

The recess which receives the bearing assembly 36 is of somewhat greater length than the bearing assembly. As shown in Fig 19, the bearing bracket may be tilted as much as 25° and still provide proper fitting for the bearings to support heavy rolls of material being displayed. The open type bearing bracket, whether of the vertical type shown in Fig 17 or the horizontal base type shown in Fig. 14, is therefore capable of being mounted in various positions and therefore is not limited to mounting on horizontal or vertical frame members.

Although I have described several embodiments of my invention and the best means I have contemplated of applying the principles thereof, it will be apparent that other modifications might be made and that various changes might be incorporated. I therefore do not wish to be limited to the precise details set forth above, but I desire to avail myself of all such changes and alterations as may follow within the purview of the following claims:

I claim:

1. A roller bearing assembly comprising a pair of straight side plates carrying one anti-friction bearing roller therebetween, a pair of offset side plates carrying another anti-friction roller therebetween, a pin connecting said pairs of plates to form a hinged assembly, and a spacer carried by said pin to hold said plates in properly spaced relationships.

2. A bearing unit for supporting a shaft carrying a heavy roll of sheet material in display racks and the like, comprising a bearing housing adapted to be mounted in various angular positions provided with a restricted opening adapted to receive a portion of the shaft to be supported, a recessed channel of arcuate form in longitudinal cross section in said housing for an anti-friction bearing assembly, a hinged anti-friction bearing assembly in said channel adapted to be collapsed for insertion and removal through said restricted opening and having arcuate bearing surfaces which conform with the arcuate form of said channel when said assembly is in its extended relation, said channel being of greater circumferential length than said bearing assembly to permit adjustable positioning of said assembly as required by the angular position at which said housing is mounted.

3. In a display rack for relatively heavy flexible sheet material such as rugs or linoleum, an elongated shaft upon which such a sheet of material may be wound, aligned bearing brackets into which opposite ends of said shaft respectively extend, said brackets having side walls defining an arcuate channel in each bracket concentric with the axis upon which said shaft is to be supported, a bearing assembly comprising two pairs of arcuate links pivoted together at their adjacent ends and having bearing rollers at their remote ends, said pairs of links being rested and confined in an operating position within said channel and having said rollers mounted thereon in such a relation that when said links are in said operating position said rollers extend beyond the edges of said side walls to thereby afford bearings for said shaft or the like rested over said side walls, and flanges on the ends of said shaft engaging the remote end edges of said rollers to hold said shaft against axial displacement.

4. In a shaft-supporting bearing unit for use in display racks for rugs, linoleum and the like, a bearing bracket affording an arcuate wall, spaced side walls along opposite edges of said arcuate wall, and end walls connecting said side walls and said arcuate wall at the ends thereof to afford an arcuate bearing channel defined by said walls, a bearing assembly comprising two pairs of arcuate links pivoted together at their adjacent ends and having bearing rollers at their remote ends, said pairs of links being rested and confined in an operating position within said channel and having said rollers mounted thereon in such a relation that when said links are in said operating position said rollers extend beyond the edges of said side walls to thereby afford bearings for a shaft or the like rested over said side walls, and lugs on one of said walls for securing said bracket in position on a support.

LEON H. BEST.

No references cited.